United States Patent [19]

Wainwright et al.

[11] E Re. 31,611

[45] Reissued Jun. 26, 1984

[54] LUBRICANT COMPOSITIONS

[75] Inventors: Paul Wainwright, Chelmsford; Michael J. Green, Wetherby; Barry S. Charlston, Castleford, all of England

[73] Assignee: Rocol Limited, Swillington, England

[21] Appl. No.: 258,448

[22] Filed: Apr. 28, 1981

Related U.S. Patent Documents

Reissue of:

[64] Patent No.: 4,159,252
Issued: Jun. 26, 1979
Appl. No.: 893,609
Filed: Apr. 4, 1978

[30] Foreign Application Priority Data

Apr. 6, 1977 [GB] United Kingdom ..... 14590/77
Jan. 17, 1978 [JP] Japan ..... 53-2843

[51] Int. Cl.[3] ..... C10M 1/10; C10M 3/02; C10M 5/02; C10M 7/02

[52] U.S. Cl. ..... 252/25; 252/58

[58] Field of Search ..... 252/25, 58

[56] References Cited

U.S. PATENT DOCUMENTS

| | | | |
|---|---|---|---|
| 3,130,158 | 4/1964 | Daly | 252/25 |
| 3,287,264 | 11/1966 | Topper | 252/58 |
| 3,437,593 | 4/1969 | Bellavin | 252/25 |
| 3,525,690 | 8/1970 | Christian | 252/25 |
| 3,607,747 | 9/1971 | Ishikawa | 252/58 |
| 3,826,744 | 7/1974 | Holinski et al. | 252/25 |
| 3,843,528 | 10/1974 | Bailey et al. | 252/25 |
| 3,888,776 | 6/1975 | Silverstein | 252/25 |
| 4,003,839 | 1/1977 | Van Hesden | 252/25 |

FOREIGN PATENT DOCUMENTS

| | | |
|---|---|---|
| 904232 | 2/1954 | Fed. Rep. of Germany . |
| 909618 | 4/1954 | Fed. Rep. of Germany . |
| 789562 | 1/1953 | United Kingdom . |
| 1100189 | 1/1964 | United Kingdom . |
| 960059 | 10/1964 | United Kingdom . |

*Primary Examiner*—Jacqueline V. Howard
*Attorney, Agent, or Firm*—Larson and Taylor

[57] ABSTRACT

A lubricant composition for use alone or in a lubricating base, comprising a finely divided carbonate of Group IIA metal and a halogenated organic lubricant.

19 Claims, 5 Drawing Figures

Figure 1:
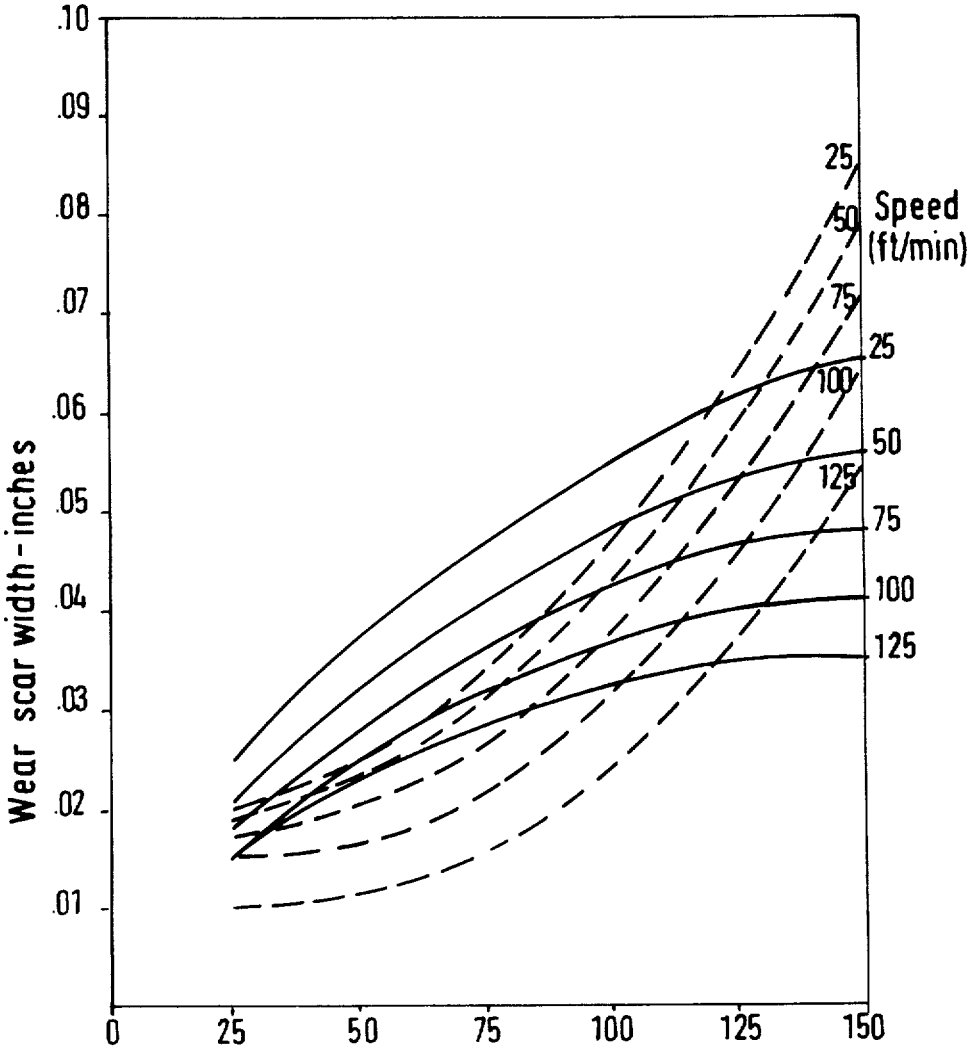

FIG.1 Wear v Load - Blend 7 (full lines)
" " - Blend 8 (dotted lines)

Figure 2:
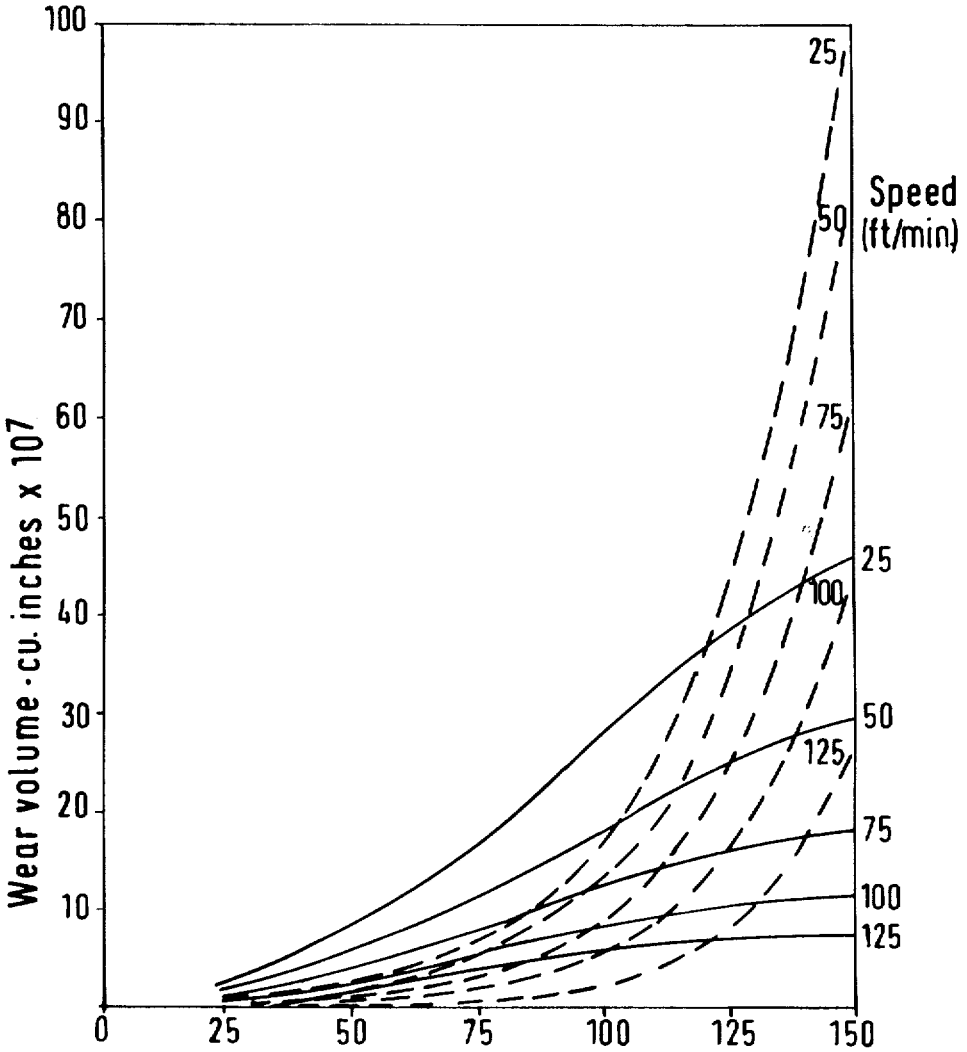

FIG. 2 Wear v Load - Blend 7 (full lines)
" " - Blend 8 (dotted lines)

Figure 3:
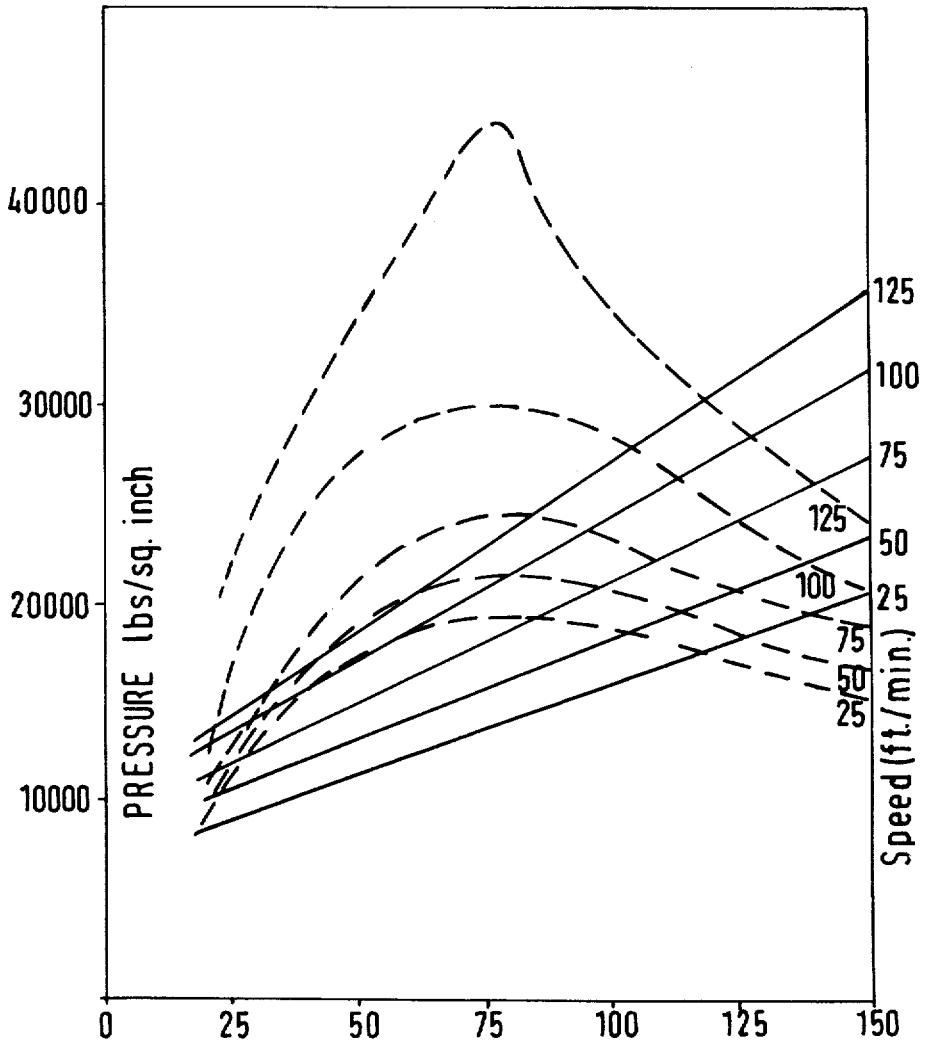

FIG. 3 Final Pressure v Load - Blend 7 (full lines)
" " " - Blend 8 (dotted lines)

Amsler wear test machine results - Blend 8

Amsler wear test machine results - Blend 7

LUBRICANT COMPOSITIONS

Matter enclosed in heavy brackets [ ] appears in the original patent but forms no part of this reissue specification; matter printed in italics indicates the additions made by reissue.

The invention relates to lubricating compositions.

The use of solid lubricants e.g. graphite and molybdenum disulphide as additives to greases and other lubricants, is well known. Addition of solid fillers such as calcium carbonate to lubricating greases in order to reduce the cost of the product composition has also been practised to some extent for many years.

It has been widely accepted that molybdenum disulphide is particularly effective under high loads and that it has the property of reducing wear under these conditions. Recently however rapid increases in the price of molybdenum disulphide have prompted research into cheaper, but equally effective alternatives.

Surprisingly we have discovered that compositions containing in combination a halogenated organic lubricant and a Group IIA metal carbonate, optionally with molybdenum disulphide also, give excellent results, comparable to or in some circumstances better than those given by conventional molybdenum disulphide compositions. The best results are obtained when an alkaline earth metal sulphate or other inorganic sulphate is present also.

The compositions may be used alone or in lubricating bases, particularly synthetic and mineral oil greases, in which the amount of additives relative to the base may vary widely according to the type of product and its intended use. There are for example products on the market with 3% molybdenum disulphide and others with 50%, and the compositions of the invention may substitute for all of part of these amounts or be present in any other effective amount compatible with the required physical properties of the product. Generally, the final products may be pastes, greases, oils or solid lubricating films; where the compositions are sold alone they may be for use as lubricants in theemselves or use by lubricant blending manufacturers.

The amount of weight of inorganic sulphate, where used, is preferably comparable to that of the halogenated lubricant, with 5 to 15 times as much Group IIA carbonate by weight, as halogenated lubricant.

Preferred halogenated lubricants are halogenated hydrocarbons, particularly chlorinated paraffins.

Our most preferred materials are calcium carbonate (whiting) and calcium sulphate hemihydrate, preferably in combination with the chlorinated paraffins, but other materials are successful, for example other carbonates; other sulphates such as magnesium sulphate.$7H_2O$, calcium sulphate mono- and di-hydrates, anhydrous sodium sulphate, potassium sulphate, potassium aluminium sulphate, zinc sulphate, sodium hydrogen sulphate, and sodium thiosulphate.$5H_2O$; and, among halogenated lubricants, materials exemplified by 'Cereclor' (Trade Mark) chlorinated long chain paraffin hydrocarbons grades 70 (powder), 70 L, 63 L and 50 LV (I.C.I); similar bromoparaffins; fluorinated graphites of formula $(CF_x)_n$(Air Products); 'Monoflor' (Trade Mark)53 and 91 fluorocarbons, which are liquids of formula $(C_2F_4)_n$ made by ionic polymerisation of tetrafluoroethylene (I.C.I); 'Fluon' (Trade Mark) L 169 polytetrafluoroethylene (I.C.I); oligomer based fluorochemical waxes such as RDPE and RDPE-S Wax (I.C.I.): and low molecular weight chlorotrifluoroethylene polymers of formula $(CF_2.CFCl)_n$, such as Halocarbon Products' Oil 14-25.

The inorganic materials are, as will be understood, in finely divided form, for example the carbonate is suitably 99% less than 25 microns, 93% less than 10 microns.

The successful results of the invention are specific to the combination of components, as is shown by the following results of tests of various blends in white petroleum jelly as a lubricating base. The tests were done in the well known 'Seta-Shell' (Trade Mark) four ball test machine, used for assessing lubricant performance under extreme pressure. The smaller the scar diameter found, the better the lubricant. The compositions are by weight, the amounts of additives being relative to the composition as a whole.

The first five blends are comparative, showing first the petroleum jelly alone; then the effects of calcium sulphate hemihydrate, 'Cereclor' (Trade Mark) 63 L (a chlorinated paraffin containing 63% chlorine), and 'Snowcal' (Trade Mark) 8/SW whiting (calcium carbonate) individually; and then the effect of the calcium sulphate and calcium carbonate together. Blends 6 [to 9], *7, 9 and 10* show compositons containing halogenated lubricant and thus according to the invention, Blend 6 without calcium sulphate and Blends 7 [to 9 with. Blend 8 ], *9 and 10 with. Blend 10 'further contains molybdenum disulphide, and Blend* 9 (an assembly paste) anatase $TiO_2$, primarily to give a good white appearance but also giving a very high ultimate failure (weld) load.

Except at the lowest pressures Blend 7, with calcium sulphate, is better than Blend 6, and both are better than even the best of the comparative blends, particularly at the highest pressures, where a scar diameter of over 2 mm indicates approaching failure.

Finally in Blends 8 and 11 there are shown for comparison the effects of molybdenum disulphide (Blend 8) and 'Lonza' (Trade Mark) KS 2.5, a high quality artificial graphite (Blend 11). It will be noted that the compositions of the invention are superior to both these compositions throughout.

The results are as follows:

TABLE 1

FOUR BALL TEST MACHINE RESULTS FOR VARIOUS LUBRICATING COMPOSITIONS (SCAR DIAMETERS IN MM)

| | | APPLIED LOAD - KG | | | | | | | | | | |
|---|---|---|---|---|---|---|---|---|---|---|---|---|
| BLEND | COMPOSITION | 56 | 100 | 158 | 200 | 251 | 316 | 355 | 398 | 447 | 501 | 562 |
| 1. Blend (Comparative) | White petroleum jelly | 1.58 | 2.59 | Welds at 141 kg | | | | | | | | |
| 2. Blend (Comparative) | White petroleum jelly (a) + (a) 2% (b) 20% $CaSO_4.\frac{1}{2}H_2O$ (b) | 0.33<br>— | 133<br>0.46 | 2.20<br>— | 2.48<br>1.24 | Weld<br>— | 1.48 | Weld | | | | |
| 3. Blend | White petroleum jelly + 2% Cereclor 63L | 0.43 | 0.66 | 2.07 | 2.55 | Welds at | | | | | | |

TABLE 1-continued

FOUR BALL TEST MACHINE RESULTS FOR VARIOUS LUBRICATING COMPOSITIONS (SCAR DIAMETERS IN MM)

| BLEND | COMPOSITION | APPLIED LOAD - KG | | | | | | | | | | |
|---|---|---|---|---|---|---|---|---|---|---|---|---|
| | | 56 | 100 | 158 | 200 | 251 | 316 | 355 | 398 | 447 | 501 | 562 |
| (Comparative) 4. Blend | White petroleum jelly + 20% whiting (Snowcal 8/SW) | 0.43 | 0.66 | 0.86 | 0.96 | 224 kg 1.45 | 1.66 | 1.76 | 1.78 | 1.96 | 2.15 | 2.27 |
| (Comparative) 5. Blend | White petroleum jelly + 20% whiting +2% $CaSO_4.\frac{1}{2}H_2O$ | 0.41 | 0.61 | 0.93 | 1.10 | 1.12 | 1.51 | 1.52 | 1.57 | 1.68 | 2.27 | 2.24 |
| Blend 6. | White petroleum jelly + 20% whiting + 2% Cereclor 63L | 0.33 | 0.39 | 0.72 | 0.90 | 0.97 | 1.06 | 1.36 | 1.53 | 166 | 1.79 | 1.84 |
| Blend 7. | White petroleum jelly + 20% whiting + 2% Cereclor 63L + 2% $CaSO_4.\frac{1}{2}H_2O$ | 0.34 | 0.42 | 0.66 | 0.78 | 0.93 | 1.04 | 1.22 | 1.44 | 1.49 | 1.54 | 1.73 (Welds at 708 kg) |
| Blend 10. | As Blend 7 + 20% $MoS_2$ | — | 0.42 | — | 0.60 | — | 1.04 | — | — | — | — | (Weld at 631 kg) |
| Blend 9. | As Blend 7 + 8% 'Tions G' anatase $TiO_2$ | — | 0.39 | — | 0.90 | — | 1.28 | — | — | — | — | (No weld at 794 kg) |
| Blend 8. (Comparative) | Rocol ASP amber petroleum jelly + 50% $MoS_2$ | 0.35 | 0.42 | 0.96 | 1.14 | 1.43 | 1.47 | 1.44 | Weld | | | |
| Blend 11. (Comparative) | White petroleum jelly + 50% graphite | 0.36 | 0.46 | 0.71 | 1.23 | 2.00 | Weld | | | | | |

In addition to the results shown in Table 1 the mean Hertz loads (a figure corrected for indentation of the balls and indicating wear properties over a range of loads) of Blends 7, 10, 9, 8 and 11 were determined at 104.7, 118.1, 99.9, 85.0 and 68.5 kg respectively.

In further tests magnesium sulphate.$7H_2O$ and anhydrous sodium sulphate were substituted for the calcium sulphate sulphate. $\frac{1}{2}H_2O$ of Blend 7 above and 'Monflor' 53 for the 'Cereclor', with the results shown in Table 2.

TABLE 2

| Substituted Material | Scar diameter (mm) at load (kg.) | | | | |
|---|---|---|---|---|---|
| | 71 | 100 | 126 | 200 | 316 |
| $MgSO_4.7H_2O$ (Blend 12) | 0.31 | 0.43 | 0.57 | 1.13 | 1.16 |
| $Na_2SO_4$ (Blend 13) | 0.33 | 0.45 | 0.48 | 1.05 | 1.09 |
| *Monoflor 33 (Blend 14)* | *0.38* | *0.42* | *0.43* | *0.68* | *1.54* |
| [Monoflor 53 (Blend 14)] | 0.38 | 0.42 | 0.43 | 0.68 | 1.54 |

In the following, further results showing the merits of the compositions of the invention are discussed, the 'blends' referred to being those of Table 1.

1. COMPARISON OF BLEND 7 WITH A KNOWN ANTI-SCUFFING PASTE

Test Method

The preferred composition in petroleum jelly (Blend 7) was compared with Blend 8, which is known anti-scuffing paste as used in engineering on an 'Amsler' wear test machine. In this machine two discs 2.5 inches (6.35 cm) diameter and 0.25 inches (6.35 mm) wide are used. One disc, of phosphor bronze, is fixed whilst the other, of hardened steel, can be rotated and loaded edge-on against the stationary disc. Rotation of the steel disc under load produces a wear scar on the bronze disc which can be accurately measured.

The technique used is to smear the two discs with the lubricant blend. The steel disc is rotated at a fixed speed and then loaded against the bronze disc, the test being continued for a given time calculated from the peripheral speed of the steel disc, and chosen to give a total of 250 feet (76.2 m) of sliding at the contact.

At the conclusion of each test the bronze disc is moved to give a fresh contact position and the test repeated at a higher load. A range of loads from 25 kg upwards in 25 kg steps up to 150 kg is used and the sliding speeds are from 25 feet/minute (12 cm/sec) in 25 feet/minute (12 cm/sec) steps up to 125 feet/minute (60 cm/sec). Each test is repeated to give a total of 3 tests for each condition.

Results

Figure 4:
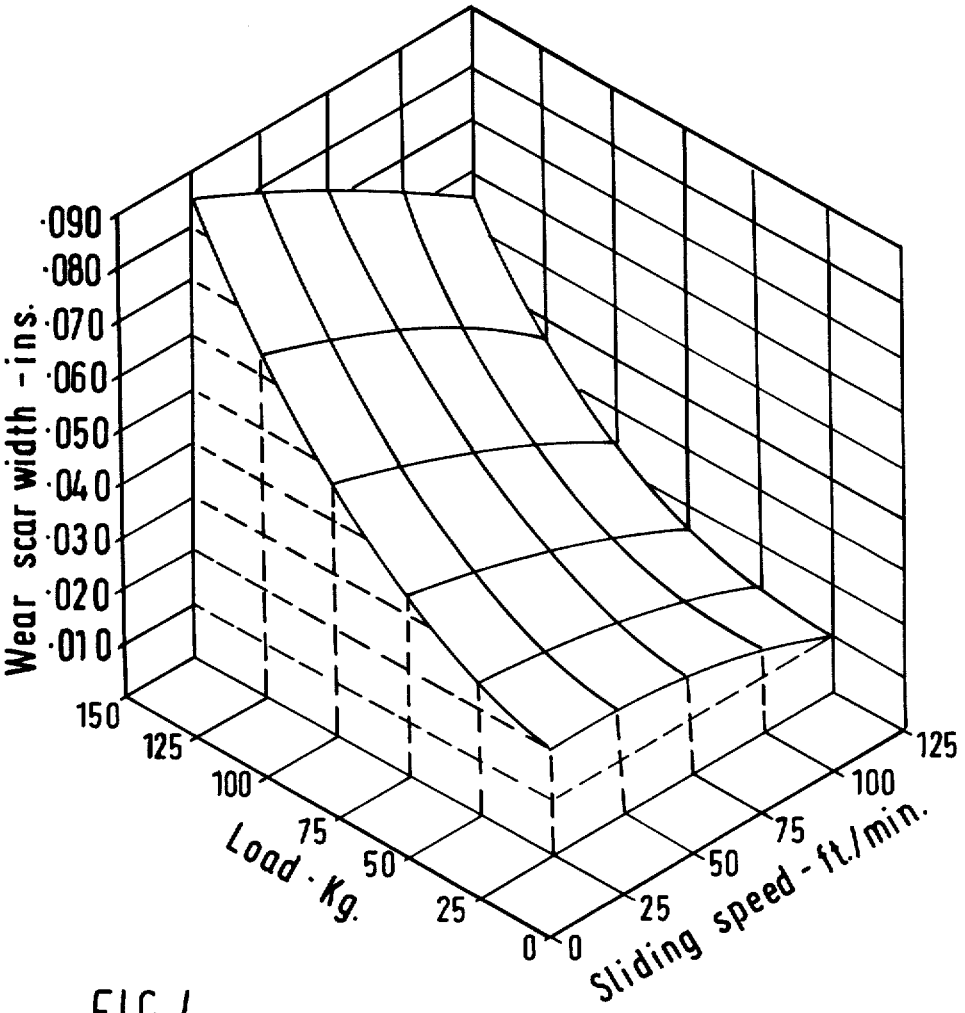
Figure 5:
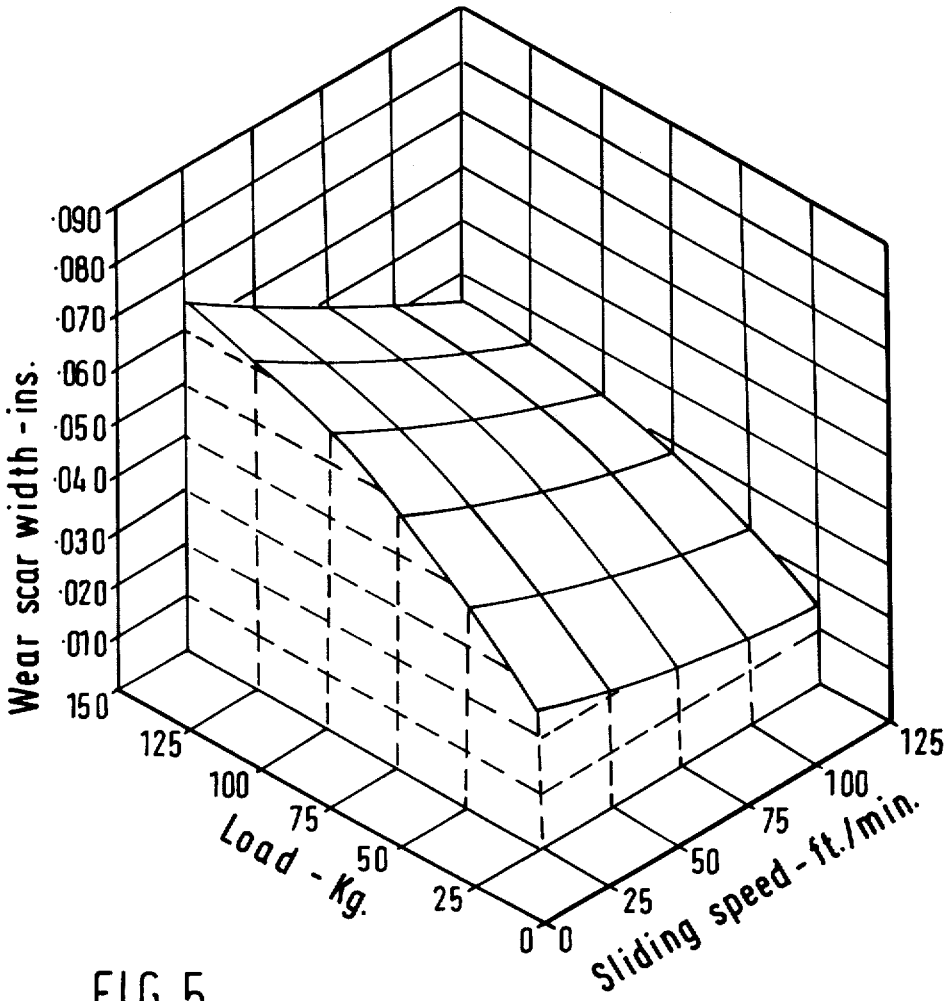

The wear scar measurement results in inches (cm×0.394) are plotted in FIG. 1, and also in FIGS. 4 and 5 as three dimensional plots. The measurements, converted to volume of material worn away in cubic inches ($cm^3 \times 0.06$) and for clarity multiplied by $10^7$, are plotted in FIG. 2. Finally the wear scar width and applied loads have been used to calculate the final contact pressure, plotted in FIG. 3.

Discussions of Results

In broad terms the blends show the same general characteristics in that the amount of wear increases as the load increases, although not in direct proportionality, and also in that for any given applied load wear decreases as the speed is increased. (Care should be taken that the wear versus speed characteristics are not wrongly interpreted; the wear is for a given number of revolutions of the disc and not a constant time. Thus the 25 ft/min (12 cm/sec) tests ran for 10 minutes to produce the wear scar shown whereas the 125 ft/min (60 cm/sec) tests ran for 2 minutes only.)

Examination of the wear curve shape however shows important differences between the blends. The curve slopes are quite different. In terms of magnitude of wear Blend 8 is clearly better at lower loads but the difference decreases as load increases and the curves cross-/over, so that the Blend 7 exhibits a lower wear at higher loads. More significantly than actual wear scar width for a given load is that increase in wear with increase in load shows opposite characteristics for the two blends. With Blend 8 the increase becomes progressively greater as load increases but with Blend 7 the increase becomes progressively less.

Examination of the final contact pressure curves shows that Blend 8 gives a peak pressure at about 75 kg applied load—for all speeds—and thereafter decreases, whilst the Blend 7 contact pressure continues to rise. The full significance of this feature is not properly understood; it may well be that this represents a scuffing criterion or a change from 'mild' to 'severe' type of wear. However it does illustrate the superiority of Blend 7 at higher contact loads.

Conclusions

The above tests show that the preferred composition in petroleum jelly (Blend 7) is effective as an anti-scuffing compound. In particular the preferred composition is more effective than the known Blend 8 at higher loads. This represents a significant advance in current boundary lubricant technology, since molybdenum disulphide is at present regarded as the most important solid lubricant in commerce for boundary lubrication.

Conclusion

These results show the anti-seize properties of Blend 7 to be as good as a known anti-seize lubricant containing molybdenum disulphide.

3. PART REPLACEMENT OF MOLYBDENUM DISULPHIDE IN COMMERCIAL OPEN GEAR GREASE

An important commercial use of molybdenum disulphide is to improve the performance of open gear lubricants. Part replacement of molybdenum disulphide by cheaper, but equally effectivealternatives, is of significant commercial importance.

Test Method

A number of grease blends were made up at different molybdenum disulphide replacement levels. Table 5 below gives the composition of each blend, by weight.

TABLE 5

| | Parts by Weight | | | |
|---|---|---|---|---|
| | Blend A (Comparative) | Blend B | Blend C | Blend D |
| Basic Grease | | | | |
| 'Baragel' clay thickener | 6.0 | 6.0 | 6.0 | 6.0 |
| 'Dioxitol' solvent | 1.0 | 1.0 | 1.0 | 1.0 |
| Water | 0.1 | 0.1 | 0.1 | 0.1 |
| 'Pool 20' hydrocarbon oil | 83.9 | 83.9 | 83.9 | 83.9 |
| Additives | | | | |
| 'TF' grade $MoS_2$ | 9.0 | 6.0 | 3.0 | — |
| 'Cereclor 63L' chlorinated paraffin | — | 0.15 | 0.30 | 0.45 |
| $CaSO_4.\frac{1}{2}H_2O$ | — | 0.15 | 0.30 | 0.45 |
| 'Snowcal 8/SW' whiting | — | 1.53 | 3.06 | 4.59 |
| | 100.0 | 98.83 | 97.66 | 96.49 |

2. COMPARISON OF ANTI-SEIZURE PROPERTIES

Commercial anti-scuffing pastes such as Blend 8 are widely used as anti-seize lubricants on fasteners subjected to high temperatures. Comparison with the performance of Blend 7 under such conditions is given below.

Test Method

Mild steel nuts and bolts are:

(i) degreased (ii) treated with the blend.

(iii) tightened to a torque of 50 lb.ft (6.9 kg.m)

(iv) subjected to the test conditions.

(v) breakloose and prevailing torque are determined.

Results (The torque figures quoted are in lb.ft (kg.m×0.138); BLT stands for break loose torque.)

TABLE 3

Test = 1 hour at 500° C. using ⅝ inch (1.59 cm) UNF (Unifed Fine Standard) mild steel nuts and bolts.

| | BLT | | MEAN | | Prevailing torque | | |
|---|---|---|---|---|---|---|---|
| Blend 7 | 60 | 66 | 69 | 65 | 12 | 7 | — |
| Blend 8 | 55 | 48 | 53 | 52 | 2 | 3 | — |

TABLE 4

Test = 1 month (i.e. 31 days) outdoors using the same nuts and bolts.

| | BLT | | MEAN | | Prevailing torque | | |
|---|---|---|---|---|---|---|---|
| Blend 7 | 55 | 65 | 57 | 59 | 1 | 5 | 3 |
| Blend 8 | 50 | 50 | 68 | 56 | 14 | 1 | 1 |

The volume of solids is the same in each formulation, i.e. replacement is by volume, not weight.

Results

The load carrying properties of the greases were tested on the Seta-Shell four ball test machine with the following results:

TABLE 6

| Blend | Mean Hertz Load | Weld Load |
|---|---|---|
| A | 64.5 | 282 |
| B | 86.5 | 316 |
| C | 89.6 | 398 |
| D | 88.0 | 355 |

Conclusion

The results show that the load carrying properties of the grease are improved by the additives of the invention, and that they can be used as a full or part replacement for molybdenum disulphide.

4. DETAILS OF MATERIALS

The materials used above are further characterised as follows.

(a) 'Cereclor' (Trade Mark) 63 L is a chlorinated paraffin, manufactured by I.C.I. Ltd., and has the following properties:

| | |
|---|---|
| Chorine content | 63% |
| Molecular weight | 430 |
| Appearance | Clear pale yellow liquid |
| Colour | 150 Hazen units |
| Density at 25° C. (77° F.) | 1.43 g/ml |
| Density at 99° C. (210° F.) | 1.35 g/ml |
| Viscosity at 25° C. | 150 poises |

-continued

| | |
|---|---|
| Viscosity at 40° C. | 1000 cs |
| Viscosity at 100° C. | 18 cs |
| Pour point (IP 15) | approx. 0° C. |
| Normal free acidity at HCl | 0.002% |
| Normal free chlorine | 0.0003% |
| [-continued] | |
| Stability 4 hrs./175° C. | 0.02% HCl released |
| Flammability | Non-flammable |

(b) 'Dioxitol' (Trade Mark) as supplied by Shell Chemicals Ltd., and is diethylene glycol monoethyl ether.

(e) Pool 20='Gulfrex' (Trade Mark) 255 A mineral oil of the following properties:

| | |
|---|---|
| Specific gravity at 60° F. | 1.018 |
| Redwood Viscosity at 70° F. | 2420 |
| Redwood Viscosity at 140° F. | 296 |
| Flash point | 500° F. |
| Pour point | 15° F. |

(d) 'Snowcal' (Trade Mark) 8/SW

Ref. BWF 40; a general purpose finely ground filler classified by water levigation. Its soft texture ensures easy incorporation into rubber and plastic formulations.

| | |
|---|---|
| Physical Properties | |
| Percentage cumulative residue on BS Sieve No. | |
| 120 (125 microns) | trace |
| 240 63 microns | 0.02 |
| 350 45 microns | 0.05 |
| Percentage finer than | |
| 25 microns | 99 |
| 20 microns | 98 |
| 10 microns | 93 |
| 5 microns | 76 |
| 3 microns | 54 |
| Geometric Mean Diameter (microns) | 2-3 |
| Specific surface by air permeability ($cm^2 g^{-1}$) | 10.300 |
| Hegman Gauge No. (North Scale) | 5.0 |
| Hardness (Mohs) | 2-3 |
| Colour: CIE Tristimulus Y Value | 87.0 |
| Specific gravity | 2.7 |
| Bulk Density: Loose (lb $ft^{-3}$) | 36 |
| Compacted (lb $ft^{-3}$) | 50 |
| Loose (kg $liter^{-1}$) | 0.58 |
| Compacted (kg $liter^{-1}$) | 0.80 |
| Void Volume (ml 100 $g^{-1}$) | 17.3 |
| Chemical Properties | (%10) |
| Calcium Carbonate ($CaCO_3$) | 98.0 |
| Silica & Insoluble ($SiO_2$ & acid insoluble) | 1.25 |
| Alumina ($Al_2O_3$) | 0.25 |
| Ferric Oxide ($Fe_2O_3$) | 0.08 |
| Magnesia (MgO) | 0.25 |
| Sulphuric Anhydride ($SO_3$) | 0.04 |
| Potash ($K_2O$) | 0.01 |
| Soda ($Na_2O$) | 0.04 |
| Matter Soluble in Cold Water | 0.03 |
| Moisture (when packed) | 0.1 |
| Copper (Cu) | 3 ppm |
| Manganese (Mn) | 240 ppm |
| Phosphorus Pentoxide ($P_2O_5$) | 1100 ppm |
| pH of aquous extract | 8.5 |

-continued

| | |
|---|---|
| Conductivity of aqueous extract (micro mho $cm^{-1}$) | <100 |

(e) 'Baragel' (Trade Mark) is a conventional Montmorillonite clay thickener.

(f) $MoS_2$ (TF) is 'technical fine' grade molybdenum disulphide of particle size ca. 1.5 microns.

What we claim is:

1. A lubricant composition for use [alone or] in a lubricating base, comprising a finely divided carbonate of a Group IIA metal and a halogenated organic lubricant, *the carbonate being present in a major proportion with respect to the halogenated organic lubricant.*

2. A composition according to claim 1, wherein the carbonate is calcium carbonate.

3. A composition according to claim 1, further comprising a finely divided inorganic sulphate salt.

4. A composition according to claim 3, wherein the sulphate is a sulphate of a Group IA or IIA metal.

5. A composition according to claim 4, wherein the sulphate is calcium sulphate hemihydrate.

6. A composition according to claim 1, wherein the halogenated lubricant is a chlorinated paraffin.

7. A composition according to claim 1, further comprising molybdenum disulphide.

8. A composition according to claim 1, wherein the carbonate is present in an amount 5 to 15 times by weight of the halogenated lubricant.

9. A composition according to claim 8, comprising a finely divided inorganic sulphate salt in an amount by weight comparable to that of the halogenated lubricant.

*10. A lubricant comprising a lubricant base and a lubricant composition comprising a finely divided carbonate of a Group IIA metal and a halogenated organic lubricant, the carbonate being present in a major proportion with respect to the halogenated lubricant.*

*11. A composition according to claim 10, wherein the carbonate comprises calcium carbonate.*

*12. A composition according to claim 10 further comprising a finely divided inorganic sulphate salt.*

*13. A composition according to claim 12, wherein the sulphate comprises a sulphate of a Group IA or IIA metal.*

*14. A composition according to claim 13, wherein the sulphate comprises calcium sulphate hemihydrate.*

*15. A composition according to claim 10, wherein the halogenated lubricant comprises a chlorinated paraffin.*

*16. A composition according to claim 10, further comprising molybdenum disulphide.*

*17. A composition according to claim 10, wherein the carbonate is present in an amount 5 to 15 times by weight of the halogenated lubricant.*

*18. A composition according to claim 17, further comprising a finely divided inorganic sulphate salt in an amount by weight comparable to that of the halogenated lubricant.*

*19. A composition according to claim 10 wherein said lubricant composition is present in said lubricant in an amount of from 3 to 5% by weight.*

* * * * *